(12) United States Patent
Wang

(10) Patent No.: US 7,507,015 B2
(45) Date of Patent: Mar. 24, 2009

(54) MIXER FOR DENTAL MOLDING POWDER

(76) Inventor: Shu-Lung Wang, 6F, No. 70, Sec. 1, Kuang-Fu Rd., San-Chung City, Taipei Hsien (TW)

( * ) Notice: Subject to any disclaimer, the term of this patent is extended or adjusted under 35 U.S.C. 154(b) by 202 days.

(21) Appl. No.: 11/352,993

(22) Filed: Feb. 14, 2006

(65) Prior Publication Data

US 2007/0189116 A1 Aug. 16, 2007

(51) Int. Cl.
*B01F 9/22* (2006.01)
(52) U.S. Cl. ...................................................... 366/217
(58) Field of Classification Search ................. 366/139, 366/206–219, 602; 433/49, 90–91; 474/112–113; 494/19
See application file for complete search history.

(56) References Cited

U.S. PATENT DOCUMENTS

| | | | | |
|---|---|---|---|---|
| 2,823,937 A | * | 2/1958 | La Barre | 474/113 |
| 3,679,184 A | * | 7/1972 | Woodham et al. | 366/219 |
| 4,781,658 A | * | 11/1988 | Takano et al. | 474/91 |
| 5,002,518 A | * | 3/1991 | Pennatto | 474/113 |
| 6,196,940 B1 | * | 3/2001 | Lehtovaara | 474/112 |
| 6,709,151 B2 | * | 3/2004 | Schmidt | 366/219 |
| 2007/0070804 A1 | * | 3/2007 | Wang | 366/217 |
| 2007/0189116 A1 | * | 8/2007 | Wang | |

FOREIGN PATENT DOCUMENTS

| | | | | |
|---|---|---|---|---|
| JP | 63291635 | A | * | 11/1988 |
| JP | 02118251 | A | * | 5/1990 |
| JP | 2001276592 | A | * | 10/2001 |
| JP | 2002085953 | A | * | 3/2002 |
| JP | 2003071264 | A | * | 3/2003 |
| JP | 2006263691 | A | * | 10/2006 |
| JP | 2006305512 | A | * | 11/2006 |
| JP | 2007-190464 | | * | 8/2007 |
| TW | 274741 | A | | 4/1996 |
| TW | M278473 | U | | 10/2005 |

* cited by examiner

*Primary Examiner*—Charles E Cooley
(74) *Attorney, Agent, or Firm*—Muncy, Geissler, Olds & Lowe, PLLC

(57) ABSTRACT

A mixer for dental molding powder has a motor to drive a holding cup pivotally located on a chassis to rotate. A regulation device is provided that has a bolt and a screw bar to hold a pulley on the chassis. By use of a plurality of belts, the pulley and rotary wheels located on two outer sides of the chassis the holding cup can be driven to rotate. The pulley can be moved by adjusting the regulation device so that the belt can be loosened from the pulley for easy and fast replacement.

20 Claims, 6 Drawing Sheets

MIXER FOR DENTAL MOLDING POWDER

FIELD OF THE INVENTION

The present invention relates to a mixer and particularly to a mixer for dental molding powder.

BACKGROUND OF THE INVENTION

To make dentures in the dentistry, first, a master mold has to be made according to the teeth profile of the patient, then a denture is formed based on the master mold. The process of making the master mold includes mixing a molding powder or gypsum with water evenly to become viscous and curing the mixed material to become a desired shape.

The mixing operation can be accomplished through a mixer such as the one disclosed in R.O.C. patent publication No. 274741 entitled "Molding material mixer". It has a transmission mechanism with a planetary gear. When a motor in the mixer is activated, a holding trough and a holding cup pivotally located on a V-shaped chassis are rotated in opposite directions to mix the molding material.

FIG. 1 shows another "Improved transmission structure for mixers of dental molding powder" disclosed in R.O.C. patent No. M278473 that was submitted by the Applicant. It includes two belts and a plurality of pulleys and a pressing means. The pulleys are mounted onto a V-shaped chassis which has a holding trough and a holding cup located in the holding trough. The V-shaped chassis is mounted onto a spindle of a motor. The two belts wind on the pulleys. One of the belts also winds on the holding cup. When the motor is activated, the spindle of the motor drives the V-shape chassis rotating. Through chain movements of the belts and pulleys, the holding trough and holding cup on the V-shaped chassis rotate. When the mixer is rotated and used for a period of time, fatigue often occurs to the belts. The operation of the mixer is affected. Hence the belts have to be replaced regularly to maintain a desired operating condition. But the dimension of the belts is designed according to the specifications of the entire transmission mechanism. To remove the belts from the V-shaped chassis is difficult. And the holding trough and other elements have to be removed from the V-shaped chassis to do belt replacement. As shown in FIG. 1, the pulleys are located below the V-shaped chassis, and the belts are coupled on the spindle and pressed below the holding trough and the V-shaped chassis. Hence replacing the belts on the transmission structure is difficult and time-consuming.

SUMMARY OF THE INVENTION

The primary object of the present invention is to solve the aforesaid disadvantages. The invention provides a mixer for dental molding powder. It mainly includes a motor to drive a holding cup pivotally located on a chassis to rotate. The motor has a spindle running through the chassis that has a groove. The chassis has a pulley corresponding to the groove. The pulley corresponding to the groove has at least one belt. A regulation means is provided to move the pulley back and forth on the chassis. A pair of opposing rotary wheels are provided and located outside two sides of the chassis between the holding cup and the pulley. The rotary wheel has at least one belt. The holding cup further has another pulley to be coupled with groove. By means of the belt coupling on the groove, pulley and rotary wheels, the holding cup may be driven to rotate.

The regulation means includes a bolt, a screw bar running through the bolt and a balance means. The screw bar may be adjusted by turning. When the screw bar is turned towards the center of the chassis, the pulley mounted onto the chassis is moved towards the center of the mixer so that the belt can be replaced rapidly without removing other elements of the mixer. Moreover, the balance means may be moved in a fine-tune manner by the screw bar to prevent shaking of the mixer caused by unbalance during initial operation so that mixing operation can be performed without being affected.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
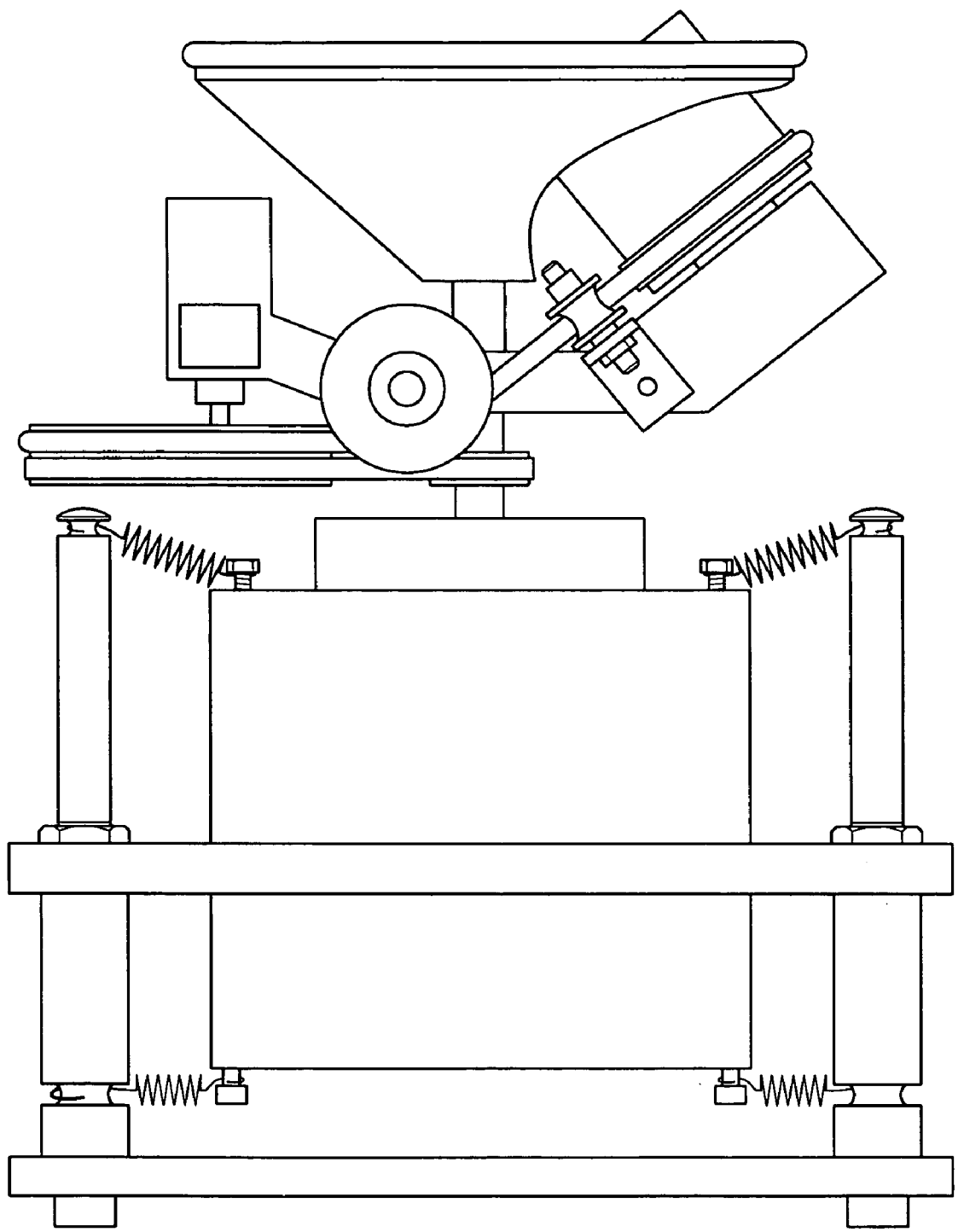
FIG. 1 is a perspective view of a conventional mixer for dental molding powder.
Figure 2:
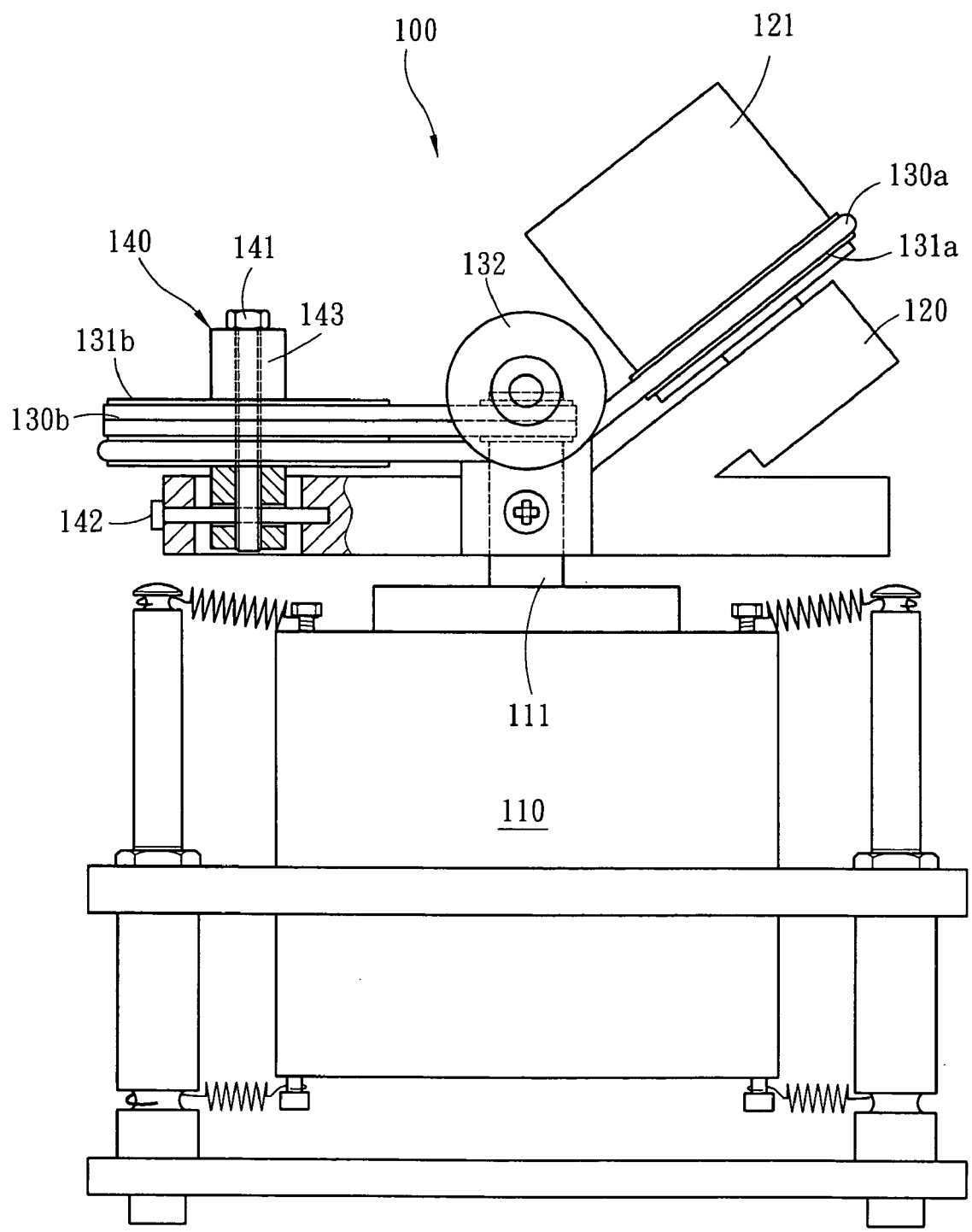
FIG. 2 is a front view of the present invention.
Figure 3:
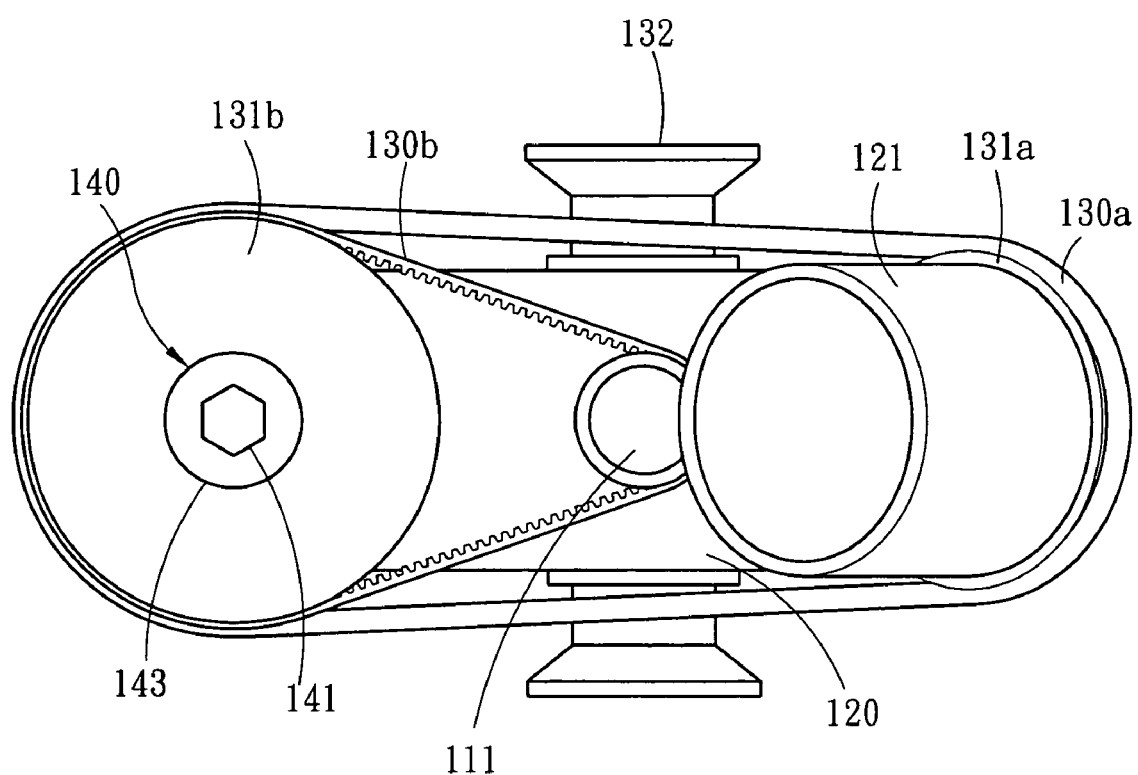
FIG. 3 is a top view of the present invention.
Figure 4:
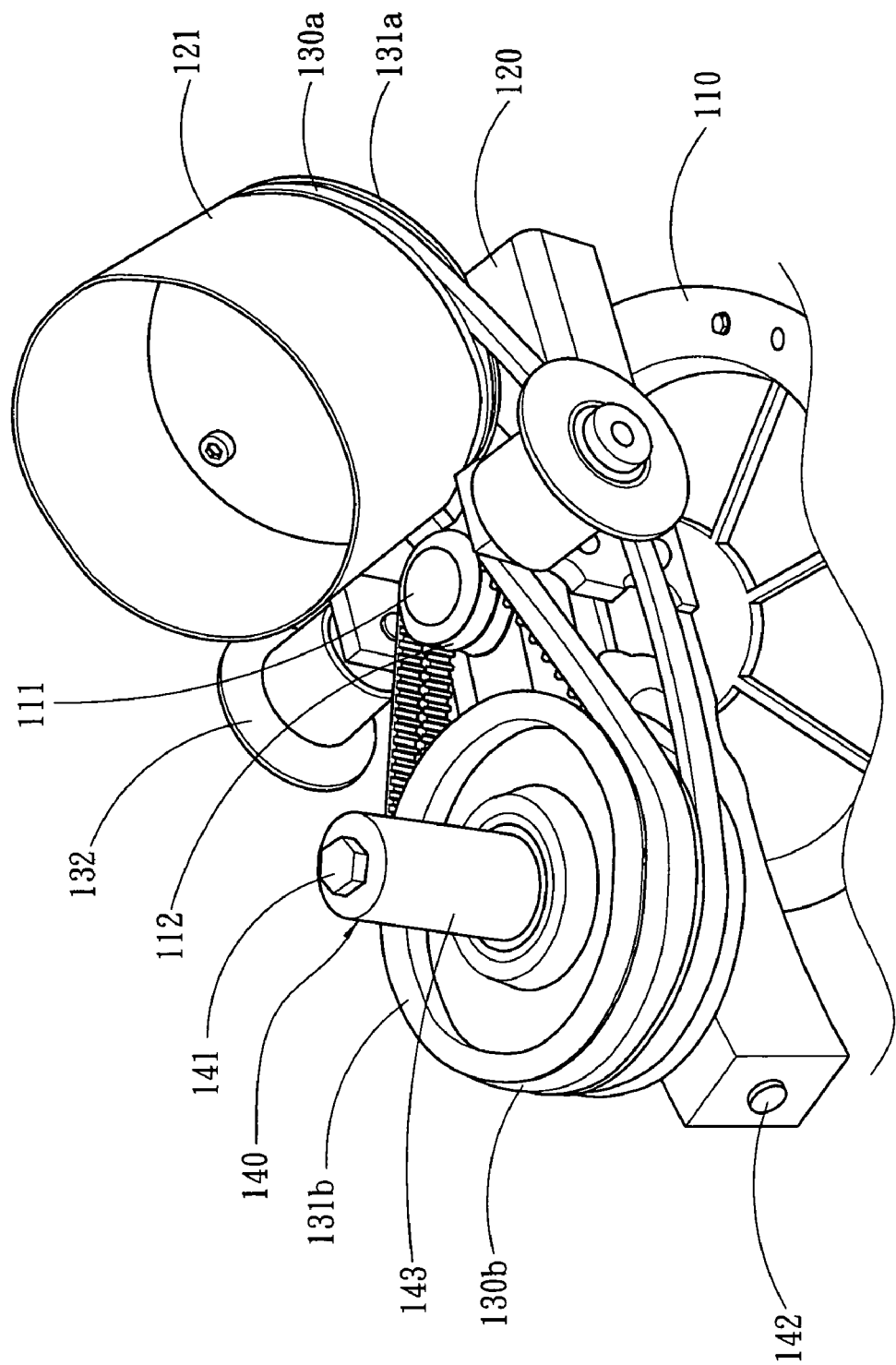
FIG. 4 is a perspective view of the present invention.

Please referring to FIGS. 2 and 3, the mixer 100 for dental molding powder according to the invention includes a motor 110 which has a spindle 111 to drive a holding cup 121 pivotally located on a chassis 120 to rotate. The holding cup has a pulley 131a. The spindle 111 runs through the chassis 120, and has one or more grooves 112 on the top end (as shown in FIG. 4). The chassis 120 has another pulley 131b corresponding to the groove 112. There is a regulation means 140 to hold the another pulley 131b on the chassis 120 and move the another pulley 131b back and forth thereon. In addition, there are a pair of opposing rotary wheels 132 located outside two sides of the chassis 120 between the holding cup 121 and the another pulley 131b. A plurality of belts 130a and 130b are provided to wind on the grooves 112, pulleys 131a and 131b and rotary wheels 132 to drive the holding cup 121 to rotate.

The regulation means 140 includes a bolt 141, a screw bar 142 running through the bolt 141 and a balance means 143. The screw bar 142 has a female screw thread. The bolt 141 has a corresponding male screw thread on where the screw bar 142 is running through. Moreover, the bolt 141 runs through, in this order, the balance means 143, the center of the another pulley 131b and the chassis 120. All the elements mentioned above are fastened to chassis 120 through the screw bar 142.

When the motor 110 drives the spindle 111, the belt 130b (which is a cog belt) coupled on the groove 112 also drives the another pulley 131b on the chassis 120 rotating (in the event that the grooves 112 and the another pulley 131b are coupled with a plurality of belts 130b, slipping and idle rotation of the belts 130b on the another pulley 131b can be prevented). As the another pulley 131b is also coupled with the belt 130a (which may be made from rubber), and the belt 130a also is coupled on the pulley 131a, when the motor 110 is activated, the belt 130a can drive the holding cup 121 rotating through the rotary wheels 132.

Figure 5A:
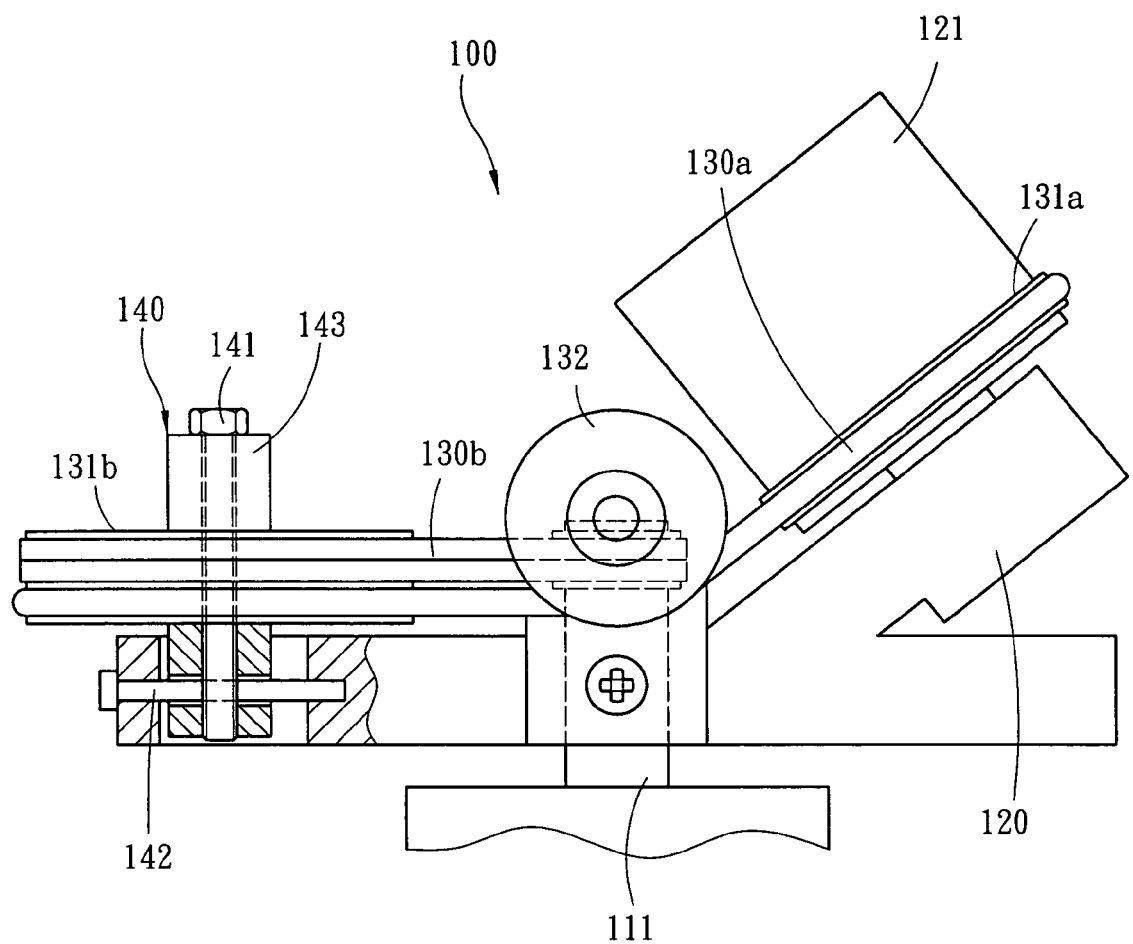
FIGS. 5A and 5B are schematic views of the present invention in operating conditions.
Figure 5B:
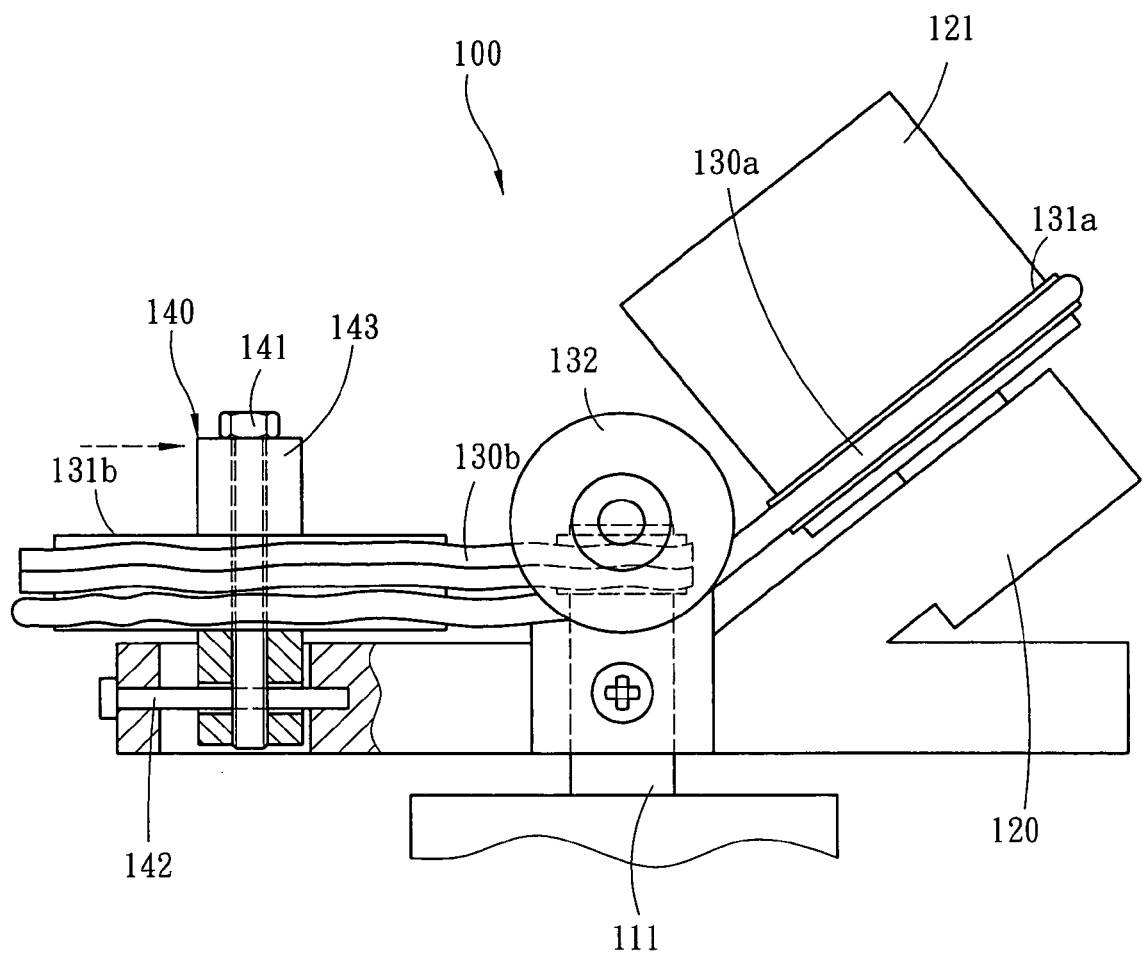

Refer to FIGS. 5A and 5B for the invention in operating conditions. The regulation means 140 may be adjusted by turning the screw bar 142. When the screw bar 142 is turned towards the center of the chassis 120, the bolt 141 is driven by the screw bar 142 to move towards the center of the chassis 120, hence the another pulley 131b also is moved towards the center of the chassis 120. The belts 130a and 130b are loosened from the pulleys 131a and 131b. Then the belts 130a and 130b can be replaced without removing other elements of the mixer 100. On the other hand, to couple the belts 130a and 130b on the pulleys 131a and 131b, turn the screw bar 142 in the opposite direction away from the center of the chassis 120. In addition, the balance means 143 can be moved by fine-tuning of the screw bar 142 so that the mixer 100 does not shake due to unbalance when the operation starts, and mixing operation can be performed without being affected.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A mixer for dental molding powder comprising
a chassis;
a motor to drive a holding cup pivotally located on the chassis to rotate,
the motor having a spindle running through the chassis, the spindle having at least one groove on the top end,
the chassis having a first pulley corresponding to the at least one groove, the first pulley having a first belt,
the first pulley being mounted onto the chassis and movable back and forth through a regulation means, the chassis further coupling with a pair of opposing rotary wheels which are located outside two sides of the chassis between the holding cup and the first pulley, and the rotary wheels having a second belt,
the regulation means further comprising a balance means having a longitudinal axis that is coincident with an axis of rotation of the first pulley.

2. The mixer of claim 1, wherein the regulation means includes a bolt and a screw bar running through the bolt.

3. The mixer of claim 2, wherein the first pulley rotates about the balance means.

4. The mixer of claim 1, wherein the first belt is a cog belt.

5. The mixer of claim 1, wherein the first belt is made from rubber.

6. The mixer of claim 1, wherein the holding cup has second pulley.

7. The mixer of claim 1, wherein the regulation means includes a bolt extending through the balance means, and a screw bar running through the bolt.

8. The mixer of claim 1, wherein the regulation means includes a bolt and a screw bar that have lengths that are perpendicular to each other.

9. The mixer of claim 1, wherein the balance means and the holding cup are disposed on opposites sides of the spindle.

10. The mixer of claim 1, wherein the balance means is aligned parallel to the spindle.

11. A mixer for dental molding powder comprising
a chassis;
a motor to drive a holding cup pivotally located on the chassis to rotate, the motor having a spindle running through the chassis, the spindle having at least one groove on the top end,
the chassis having a first pulley corresponding to the at least one groove, the first pulley having a first belt,
the first pulley being mounted onto the chassis and movable back and forth through a regulation means, the chassis further coupling with a pair of opposing rotary wheels which are located outside two sides of the chassis between the holding cup and the first pulley, and the rotary wheels having a second belt,
the regulation means further comprising a cylindrical-shaped balance means having a length extending in a direction that is orthogonal to a length of the chassis, the balance means being movable forwardly and rearwardly with respect to the length of the chassis.

12. The mixer of claim 11, wherein the regulation means includes a bolt and a screw bar running through the bolt.

13. The mixer of claim 12, wherein the first pulley rotates about the balance means.

14. The mixer of claim 11, wherein the first belt is a cog belt.

15. The mixer of claim 11, wherein the first belt is made from rubber.

16. The mixer of claim 11, wherein the holding cup has second pulley.

17. The mixer of claim 11, wherein the regulation means includes a bolt extending through the balance means, and a screw bar running through the bolt.

18. The mixer of claim 11, wherein the regulation means includes a bolt and a screw bar that have lengths that are perpendicular to each other.

19. The mixer of claim 11, wherein the balance means and the holding cup are disposed on opposites sides of the spindle.

20. The mixer of claim 11, wherein the balance means is aligned parallel to the spindle.

* * * * *